United States Patent Office
3,712,793
Patented Jan. 23, 1973

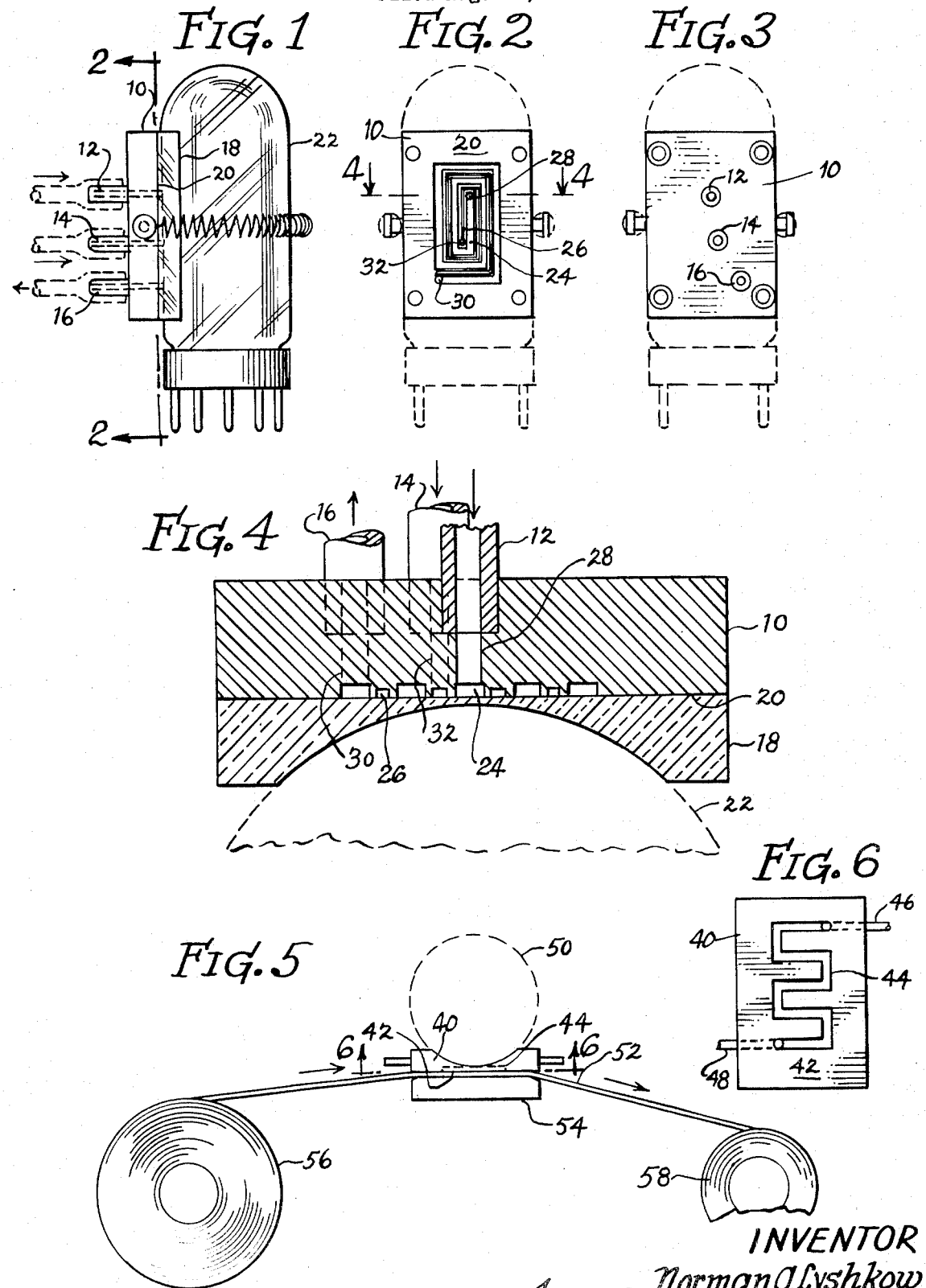

3,712,793
METHOD AND APPARATUS FOR ANALYSIS OF GAS STREAMS
Norman A. Lyshkow, 722 W. Fullerton, Chicago, Ill. 60614
Filed Aug. 16, 1971, Ser. No. 172,133
Int. Cl. G01n 21/26
U.S. Cl. 23—232 E          27 Claims

ABSTRACT OF THE DISCLOSURE

Method and apparatus for the detection and/or analysis of a gas stream in which a gaseous reactant is passed as a thin layer through a tortuous path to generate a highly turbulent flow for contact with a coreactant in the form of a solid, liquid or gas in a surface reaction to produce flashes of radiation by chemiluminescence. The flashes of radiation can then be measured as relating to the amount of gaseous reactants contained in the gas stream.

---

This invention relates to the detection and/or analysis of gas streams, and more particularly to the detection and/or analysis of gases based upon chemiluminescence.

Chemiluminescence is now a well known phenomenon, and is frequently defined as the emission of light as a result of a chemical reaction at temperatures at which light rays are not normally expected. In one sense, chemiluminescence is the reverse of a photochemical reaction. In a photochemical reaction, the absorption of light radiation leads to a chemical reaction or change, whereas in chemiluminescence a chemical reaction is accompanied by the emission of radiation.

A wide variety of chemical reactions which are known to those skilled in the art, and particularly chemical oxidations, exhibit chemiluminescence. Such reactions may include homogeneous gas phase reactions and heterogeneous solid-gas phase and liquid-gas phase reactions.

The emission of radiation as a result of chemiluminescence takes the form of flashes of light which may be visible in the UV or IR ranges, and each flash of light represents a photon event or emission from the reaction of one molecule of one of the reactants with the stoichiometric number of molecules of the coreactant. Thus, the number of flashes emitted over a given period of time is indicative of the amount of one of the reactants present.

Various attempts have been made to employ the phenomenon of chemiluminescence as an analytic tool, but without measurable success. For example, attempts have been made to carry out a chemiluminescent reaction between two gases by feeding each of the reactants through two or more concentric tubes. However, such attempts have failed to provide a chemiluminescent reaction in which the photon events have sufficient intensity to enable them to be detected with any significant degree of accuracy.

It is accordingly an object of the present invention to provide a method and apparatus for the detection and/or analysis of gases by a chemiluminescence technique.

It is a more specific object of the present invention to provide a method and apparatus for the detection and/or analysis of gases by chemiluminescent technique in which the emission of radiation can be detected and measured with improved sensitivity and accuracy.

These and other objects and advantages will appear more fully hereinafter, and, for purposes of illustration, but not of limitation, embodiments of the invention are shown in the accompanying drawing in which:

FIG. 1 is a side elevation view of one embodiment of the present invention;

FIG. 2 is a sectional view taken along the lines 2—2 in FIG. 1;

FIG. 3 is a front elevation view of the apparatus shown in FIG. 1;

FIG. 4 is a detailed view of the apparatus shown in FIGS. 1 to 3;

FIG. 5 is a schematic view of another embodiment of the invention; and

FIG. 6 is a sectional view taken along the line 6—6 in FIG. 5.

The concepts of the present invention reside in the discovery that the intensity of the photon events emitted as radiation during the course of a chemiluminescent reaction can be drastically increased by carrying out the reaction as a surface reaction. In accordance with the practice of the invention, a chemiluminescent reaction between a gaseous reactant and a solid, liquid or gaseous coreactant is carried out by passing at least the gaseous reactant at a high rate of flow through a channel defining a tortuous path whereby a thin layer of the gaseous reactant is subjected to high turbulence for contact with the coreactant. The resultant number of flashes of radiation representing photon events can be measured by known means as a measure of the amount of the gaseous reactant present.

The concepts of the present invention are applicable to any chemiluminescent reaction in which a gaseous material is reacted with a solid, liquid or gaseous correctant. Such reactions are known to those skilled in the art and include many organic and inorganic reactions. In its preferred form, the invention is applicable to a gaseous material which is in admixture with a gas which is incapable of providing a chemiluminescent reaction whereby the chemiluminescent reaction of the gaseous material can be used as a basis for analysis as to the amount of the gaseous material contained in the gas stream.

When the coreactant is also in the gaseous phase, it is preferred that the channel defining the tortuous path of the gaseous reactant be positioned closely adjacent to a second channel defining a generally parallel tortuous path for passage therethrough of the gaseous coreactant under a positive pressure as the gaseous reactant is drawn through the first channel as a reduced pressure. In this way, the coreactant under pressure is passed over the edge of the second channel in a thin surface layer and into the first channel for reaction of the thin layer of the gaseous corectant with this gaseous reactant in the first channel.

Because the coreactant is passed into the first channel containing the gaseous reactant as a thin highly turbulent layer, the chemiluminescent reaction which follows produces a series of flashes of radiation of enhanced intensity which can be detected and counted with improved accuracy.

When the coreactant is either in the solid or liquid phase, the channel for passage of the thin layer of the gaseous reactant through the tortuous path is in surface contact with the solid, or with a liquid permeable sheet wet with the liquid. In accordance with a preferred embodiment, a strip containing at least a coating of a solid coreactant or a strip wet with a liquid coreactant is slowly advanced over the channel through which a gas stream containing the gaseous coreactant is passed. In this way, the detection and/or analysis can be carried out on a continuous basis.

Referring now to the drawings, there is shown in FIGS. 1 to 4 one embodiment of the present invention for carrying out a chemiluminescent reaction between two or more gases or vapors. As shown in FIG. 1, the apparatus includes a base plate 10 in which the channels defining the tortuous path of flow are defined. The base plate 10 is provided opposite that face thereof with means 12 and 14 for supplying each of the gaseous reactant and coreactant, respectively, and means 16 for withdrawing the product of the reaction. Fixed to the face of base plate 10 is a pressure plate 18 which is in continuous surface contact with the face 20 of plate 10.

Pressure plate 18 thereby serves to substantially close the open channels formed in the face 20 of base plate 10. However, because the parallel channels in face 20 are in close proximity, a vacuum applied to one of the channels and a high pressure applied to the other of the channels cause a thin but turbulent layer of the gaseous coreactant to pass from the channel under pressure to the channel under reduced pressure to permit reaction of the gases.

The pressure plate 18 is formed of a transparent material to enable the radiation emitted during the chemiluminescent reaction to be transmitted therethrough for measurement by means 22 adapted to measure the flashes of radiation. For this purpose, use can be made of any of a variety of devices known to those skilled in the art. For example, use can be made of a photomultiplier tube as shown in FIGS. 1 to 4 in combination with suitable amplifying circuitry (not shown for purposes of simplicity) of the type conventionally employed in liquid scintillation counters.

It is frequently preferred that the face of pressure plate 18 adjacent the tube means 22 be formed with a curvature corresponding to that of tube means 22. In this way, transmission of the detectable radiation from the channel of base plate 10 to the light sensitive portion of the tube means 22 with a minimum of light scattering is facilitated.

The channels defined in the base plate are best illustrated in FIG. 2 of the drawing. As indicated by this figure, the face 20 of base plate 10 defines a pair of closely spaced channels 24 and 26 arranged in a substantially rectangular configuration of ever increasing dimensions. Thus, the gas streams flowing through each of the channels are each subjected to numerous changes in direction to thereby create a highly turbulent flow.

In the embodiment shown in FIG. 2 the channel 24 is adapted to have a gas sample containing a gas reactant drawn therethrough. Channel 24 communicates with inlet 12 by way of an opening 28 which extends through base plate 10 to enable the gas sample to be drawn through inlet means 12 through opening 28 into channel 24. The end of channel 24 terminates in an opening 30 which similarly extends through base plate 10 to enable a vacuum to be applied to channel 24 to draw the gas sample therethrough and to exhaust the products of the chemiluminescent reaction.

Channel 26 is provided with an opening 32 extending through base plate 10 to enable channel 26 to communicate with inlet means 14. In this way, the gaseous coreactant can be supplied to channel 26 through inlet 14 under a greater pressure relative to the pressure existing in channel 24. Channel 26 terminates at a "dead end" and this is not provided with a discharge opening since excess gaseous coreactant is discharged with the reaction product.

In operation, the gaseous reactant is supplied to channel 24 as a gas sample containing the gaseous reactant and is drawn through channel 24 by a vacuum applied at discharge means 16. Simultaneously, the gaseous coreactant is supplied to channel 26, and a pressure of the coreactant in channel 26 is created because channel 26 terminates without a discharge opening. Consequently, a thin turbulent layer of the gaseous coreactant is forced into channel 24 for reaction with the gaseous reactant. It is believed that the chemiluminescent reaction which occurs takes place not only in the shallow channel 24 but also at the interface between face 20 of base plate 10 and the face of pressure plate 18 to provide emissions of detectable radiation of measurable intensity.

As can also be seen in FIGS. 2 and 4, the channel 24 adapted to receive the gas sample containing the gaseous reactant has a slightly greater cross section than the channel 26 carrying the gaseous coreactant. While the relative dimensions of these two channels are not critical to the practice of the invention, it has been found generally desirable to form the channel adapted to receive the gas sample with a larger cross section since a volumetric flow of the gas sample containing frequently only small quantities of the gaseous reactant is much greater than the volumetric flow of the gaseous coreactant. In the preferred practice of the invention, it is sufficient that the coreactant be present in amounts significantly greater than the stoichiometric amount necessary for reaction with all of the gaseous coreactant in the gas sample.

As will be appreciated by those skilled in the art, the arrangement of the channels 24 and 26 in the base plate 10 can be formed in any configuration which will provide a tortuous path or flow. For example, the channels may be formed in a spiral pattern, a zig-zag pattern or the like. The channels are preferably quite shallow, generally less than 0.2 inch in depth in most constructions.

Detection and/or analysis in accordance with the practice of the present invention is preferably carried out with at least the base plate and means to measure the flashes of light being in the absence of ambient light in order to avoid exposure of the light measuring device to extraneous light. For this purpose, the apparatus can conveniently be placed in a light tight container.

As indicated above, the concepts of the present invention contemplate chemiluminescent reactions between a gaseous reactant and either a solid or liquid coreactant. Apparatus suitable for carrying out such heterogeneous reactions is illustrated in FIGS. 5 and 6 of the drawing.

As shown in FIG. 5, the apparatus includes a base plate 40 which has formed in one face 42 thereof a single shallow channel 44 which defines a tortuous path for flow of the gaseous reactant, which is supplied to channel 44 through inlet means 46. Gaseous reaction products, if any, can be withdrawn through discharge means 48.

The base plate 40 is formed of a transparent material, such as transparent plastic, glass or the like to enable radiation emitted in channel 44 to be transmitted through the base plate 40 to adjacent means for measuring the flashes of visible radiation 50 which, as indicated above, can conveniently be a photomultiplier tube. The face of base plate 40 opposite face 42 containing the channel 44 is preferably formed with a curvature corresponding to the curvature of the photomultiplier tube 50 to minimize light scattering.

The face 42 of base plate 40 in which the channel 44 is formed is in surface contact with a strip 52 which is provided with at least a layer of a solid coreactant or wetted with a liquid coreactant. The strip 52 covers at least the entire channel 44, and preferably covers substantially the entire surface of face 42 to thereby define a substantially closed passage for the gaseous reactant. In this way, a thin but turbulent layer of the gaseous reactant is drawn through channel 44 and is simultaneously contacted with the liquid or solid coreactant to effect a chemiluminescent surface reaction.

The strip 52 is maintained in surface contact with the face 42 of base plate 40 by a convenient means such as a pressure plate 54. Without limiting this embodiment of the present invention as to theory, it is believed that the chemiluminescent surface reaction between the gaseous reactant and the liquid or gaseous coreactant takes place in channel 44 and at the interface between face 42 of base plate 40 and strip 52 to provide emissions of detectable radiation of measurable intensity.

Strip 52 is formed of at least a layer of the coreactant when the latter is a solid. For this purpose, the solid coreactant can be simply coated or impregnated on a suitable base sheet formed of any material such as paper, metal, natural or synthetic polymers, etc. The coating need only be sufficient to provide the necessary amount of the solid coreactant for reaction with the gaseous reactant contained in the gas sample which is drawn through channel 44.

Alternatively, the strip 52 can be formed of the solid coreactant if desired. For example, when the solid coreactant is a metal or metal alloy, such as aluminum, the strip 52 can be an aluminum strip.

When the coreactant is a liquid, the strip 52 can be a liquid permeable strip which is wetted with the liquid.

In a preferred embodiment, the strip 52 is continuously advanced in contact with face 42 of base plate 40 to continuously supply the liquid or gaseous coreactant for reaction with the gaseous reactant contained in the gas sample drawn through channel 44. Since the concentration of the gaseous reactant in the gas sample is frequently quite low, the rate of advancement of strip 52 can generally be quite low (e.g., of the order of one inch per 24 hours) although greater rates of advancement of strip 52 can obviously be employed when greater amounts of the liquid or gaseous coreactant are required for reaction with the gaseous reactant.

The advancement of the strip 52 in surface contact with the face 42 of base plate 40 can conveniently be effected by mounting the strip on a feed roll 56 and a take-up roll 58, at least one of which is driven by suitable means (not illustrated in the drawing).

The face 42 of base plate 40 is illustrated in FIG. 6 of the drawing. As can be seen from this figure, the channel 44 is formed in face 42 and defines a tortuous path for passage of the gaseous reactant therethrough.

While the embodiment illustrated in FIGS. 5 and 6 is described as including a base plate having but a single channel for the gaseous reactant with a coreactant in either solid or liquid form is contacted with the face of the base plate, it will be understood that the face of the base plate 40 can be provided with a pair of channels like those of the embodiment illustrated in FIGS. 1 to 4.

In this embodiment of the invention, a gas sample containing a gaseous reactant can be drawn through one of the channels such as channel 24 while the gaseous coreactant is supplied to the dead end channel 26. The strip 52 can thus contain a liquid or solid catalyst for the reaction. Such an arrangement can be used, for example, in the analysis of $SO_2$ in a gas sample using ozone as the gaseous coreactant and a strip containing a layer of a suitable catalyst.

As indicated above, the concepts of the present invention are applicable to any chemiluminescent reaction between a gaseous reactant and a solid, liquid or gaseous coreactant. The gaseous reactant can be in admixture with a gas which is incapable of providing a chemiluminescent reaction, and consequently the emissions of detectable light which result are a measure of the amount of the gaseous reactant contained in the gas sample.

Thus, the present invention provides a novel method and means for measuring the amount of various pollutants in the air. For example, an air sample containing $NO_2$ as a pollutant can be analyzed in accordance with the present invention by use of a coreactant which is capable of reaction with $NO_2$ to provide a chemiluminescent reaction but which is incapable of providing a chemiluminescent reaction with air. The flashes of radiation which are produced can be counted or measured by way of, for example, a photomultiplier tube.

The output of the photomultiplier tube can then be amplified and integrated over the time which the flashes are emitted as a measure of the concentration of the $NO_2$ pollutant in the air sample.

Having described the basic concepts of the invention, reference is now made to the following examples which are illustrative of the types of chemiluminescent reactions which can be carried out in accordance with the concepts of the invention in the analysis of gas streams.

EXAMPLE 1

This example illustrates the analysis of a mixture of air and ozone by a chemiluminescent reaction with gaseous ethylene.

Using an apparatus of the type shown in FIGS. 1 to 4, a mixture of air and ozone generated by UV radiation is drawn at the rate of 250 ml./minute through channel 24. Simultaneously, channel 26 is pressurized by feeding 10 ml./minute of ethylene through inlet 14.

The resulting reaction between the ethylene and ozone at room temperature is chemiluminescent. The flashes of radiation produced are detected and counted per unit time by an RCA 4552 photomultiplier tube. The output of the photomultiplier tube is amplified and the signal is integrated with time as a measure of the ozone content of the air sample.

It is found that the analysis of the ozone content of the air sample is sensitive to as low as .001 p.p.m. of ozone in the air.

As will be appreciated by those skilled in the art, other gaseous olefins (e.g., propylene) can be used in lieu of the ethylene illustrated as long as the reaction product is a gas at the temperature and pressure of operation.

EXAMPLE 2

This example illustrates the analysis of a mixture of air and ozone by a chemiluminescent reaction with solid aluminum.

Using apparatus of the type described in FIGS. 5 and 6, a mixture of air and ozone is drawn through channel 44 at the rate of 250 ml./minute and an aluminum strip is placed in surface contact with the face 42 of base plate 40.

The ozone contained in the air sample reacts with the surface of the aluminum at room temperature to provide a chemiluminescent reaction. The radiation is measured as described in Example 1, and it is found that the analysis is sensitive to even small concentrations of ozone in the air sample.

EXAMPLE 3

This example illustrates the analysis of a mixture of $NO_2$ and air by a chemiluminescent reaction with sulfanilamide.

Using apparatus of the type illustrated in FIGS. 5 and 6, a mixture of $NO_2$ and air is drawn through channel 44, and a base sheet coated with sulfanilamide is placed in surface contact with face 42 of base plate 40.

The reaction between the sulfanilamide and the $NO_2$ contained in the air is chemiluminescent, and the flashes of radiation produced are measured in the same manner as described in Examples 1 and 2.

In lieu of the sulfanilamide employed in Example 3, use can be made of a wide variety of amines and alcohols to produce a chemiluminescence by reaction with $NO_2$. Such compounds include both solid and liquid amines and alcohols as represented by aliphatic amines and alcohols (e.g., methyl amine, ethyl amine, diethyl amine, propyl amine, butyl amine, decyl amine, dodecyl amine, ethylene diamine, butylene diamine, isopropanol, butanol, octanol, etc.) as well as aromatic and cycloaliphatic compounds. In addition, numerous quinone derivatives are quite useful in the analysis of $NO_2$. Various other compounds react with $NO_2$ to provide a chemiluminescent reaction.

It will be understood that various changes and modifications can be made in the details of construction, procedure and use without departing from the spirit of the invention, especially as defined in the following claims.

I claim:

1. A method for the detection and analysis of a gas wherein a gaseous reactant is reacted with a coreactant to produce flashes of detectable radiation by chemiluminesence comprising passing the gaseous reactant as a thin layer through a tortuous path to generate highly turbulent flow for contact with a surface layer of the coreactant, and measuring the flashes of radiation.

2. A method as defined in claim 1 wherein the gaseous reactant is drawn through the tortuous path by a vacuum.

3. A method as defined in claim 1 wherein the gaseous reactant is in admixture with a gas which is incapable of providing a chemiluminescent reaction with the coreactant.

4. A method as defined in claim 1 wherein the tortuous path of the gaseous reactant is defined by a channel formed in a substantially flat surface.

5. A method as defined in claim 1 wherein the coreactant is present in stoichiometric excess based upon the gas reactant.

6. A method as defined in claim 1 wherein the coreactant is a gas, and is passed into a tortuous path adjacent to the tortuous path of the gaseous reactant under pressure whereby the coreactant is forced into the tortuous path of the gaseous reactant as a thin layer for contact with the gaseous reactant.

7. A method as defined in claim 6 wherein the tortuous path of the coreactant is closed at one end.

8. A method as defined in claim 6 wherein the pressure of the coreactant is greater than the pressure of the gaseous reactant.

9. A method as defined in claim 6 wherein a layer of a catalyst is in surface contact with the tortuous path of the gaseous reactant and the tortuous path of the coreactant to catalyze the reaction between the gaseous reactant and the coreactant.

10. A method as defined in claim 6 wherein the gaseous reactant is ozone and the coreactant is a gaseous olefin whose reaction product with ozone is a gas.

11. A method as defined in claim 1 wherein the coreactant is in the form of a solid or a liquid, and a layer of the coreactant is in surface contact with the thin layer of the gaseous reactant as the gaseous reactant is passed through the tortuous path whereby the thin layer of the gaseous reactant reacts with the layer of the coreactant.

12. A method as defined in claim 11 wherein the gaseous reactant is ozone and the coreactant is aluminum.

13. A method as defined in claim 11 wherein the layer of the coreactant is continuously advanced in surface contact with the thin layer of the gaseous reactant.

14. A method as defined in claim 11 wherein the gaseous reactant is $NO_2$ and the coreactant is selected from the group consisting of an alcohol and an amine.

15. A method as defined in claim 14 wherein the coreactant is sulfanilamide.

16. Apparatus for detection and analysis of a gas in which a gaseous reactant is reacted with a coreactant to produce flashes of detectable radiation by chemiluminescence comprising a base plate, said base plate having on one face thereof at least one shallow channel defining a tortuous path, means to supply a gaseous reactant to the channel, means to withdraw a gas from the channel, means having a surface in surface contact with the face of the base plate to prevent the flow of gas away from the face of the channel, and means for measuring flashes of radiation positioned to receive radiation emitted from the channel.

17. Apparatus as defined in claim 16 wherein the base plate is formed of a transparent material to enable transmission of radiation from the channel to the means for measuring flashes of radiation.

18. Apparatus as defined in claim 16 wherein the means for measuring flashes of radiation includes a photomultiplier tube.

19. Apparatus as defined in claim 16 wherein the means having a surface in contact with the face of the base plate is a pressure plate.

20. Apparatus as defined in claim 19 wherein the pressure plate is transparent and is positioned between the face of the base plate and the means for measuring the flashes of light.

21. Apparatus as defined in claim 16 wherein the face of the base plate is provided with a pair of closely spaced channels, one of the channels being adapted to receive a gaseous reactant in a thin turbulent layer and the other of the channels being adapted to receive a gaseous coreactant under pressure.

22. Apparatus as defined in claim 21 wherein the other of the channels is provided with means to supply a gaseous coreactant thereto.

23. Apparatus as defined in claim 21 wherein the other of the channels is closed at one end thereof.

24. Apparatus as defined in claim 16 wherein the means having a surface in contact with the face of the base plate is at least a layer of a solid or liquid coreactant or catalyst.

25. Apparatus as defined in claim 24 which includes means to maintain the layer of coreactant in contact with the face of the base plate.

26. Apparatus as defined in claim 24 wherein the layer of coreactant is in the form of a strip.

27. Apparatus as defined in claim 26 which includes means to advance the strip in surface contact with the base plate.

References Cited

UNITED STATES PATENTS

| | | | |
|---|---|---|---|
| 3,287,089 | 11/1966 | Wilburn | 23—254 R |
| 3,647,387 | 3/1972 | Benson et al. | 23—232 R |
| 3,659,100 | 4/1972 | Anderson et al. | 23—230 RX |

MORRIS O. WOLK, Primary Examiner

R. M. REESE, Assistant Examiner

U.S. Cl. X.R.

23—254 E

UNITED STATES PATENT OFFICE
CERTIFICATE OF CORRECTION

Patent No. 3,712,793         Dated January 23, 1973

Inventor(s) Norman A. Lyshkow

It is certified that error appears in the above-identified patent and that said Letters Patent are hereby corrected as shown below:

Column 1, line 5, after "60614" please insert

-- , assignor to Pollution Monitors, Inc., Chicago, Illinois --

Signed and sealed this 14th day of January 1975.

(SEAL)
Attest:

McCOY M. GIBSON JR.
Attesting Officer

C. MARSHALL DANN
Commissioner of Patents